May 28, 1963 M. C. GROWALD 3,091,053
SELF-RUPTURING CONTAINER
Filed Sept. 16, 1960 2 Sheets-Sheet 2
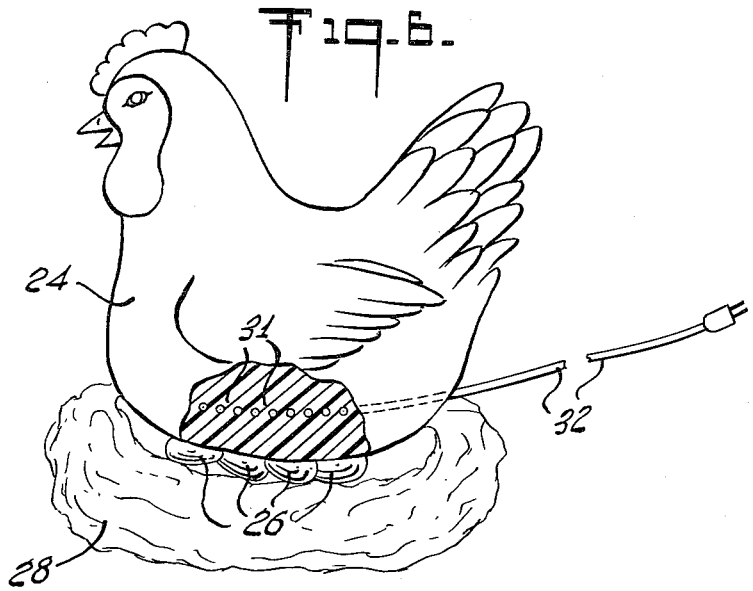
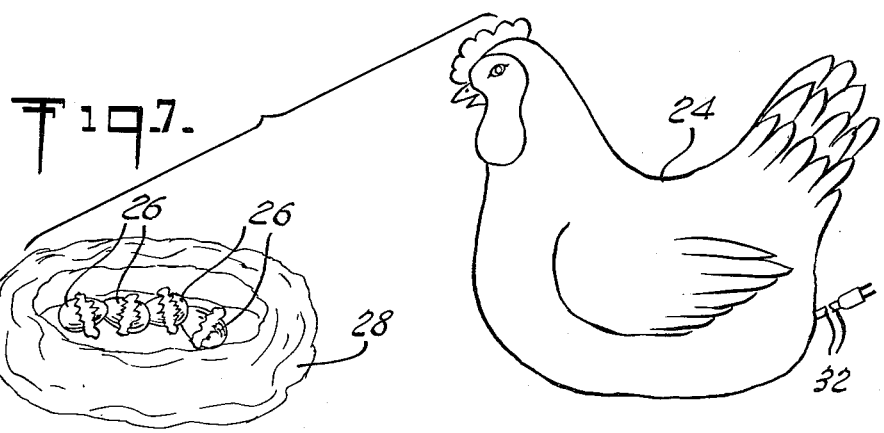
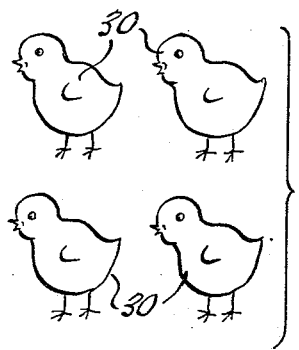
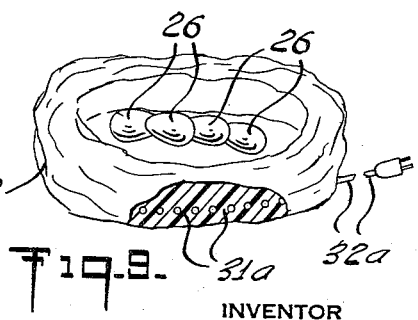
INVENTOR
Martin C. Growald
BY
Moses, Nolte, & Nolte
ATTORNEYS

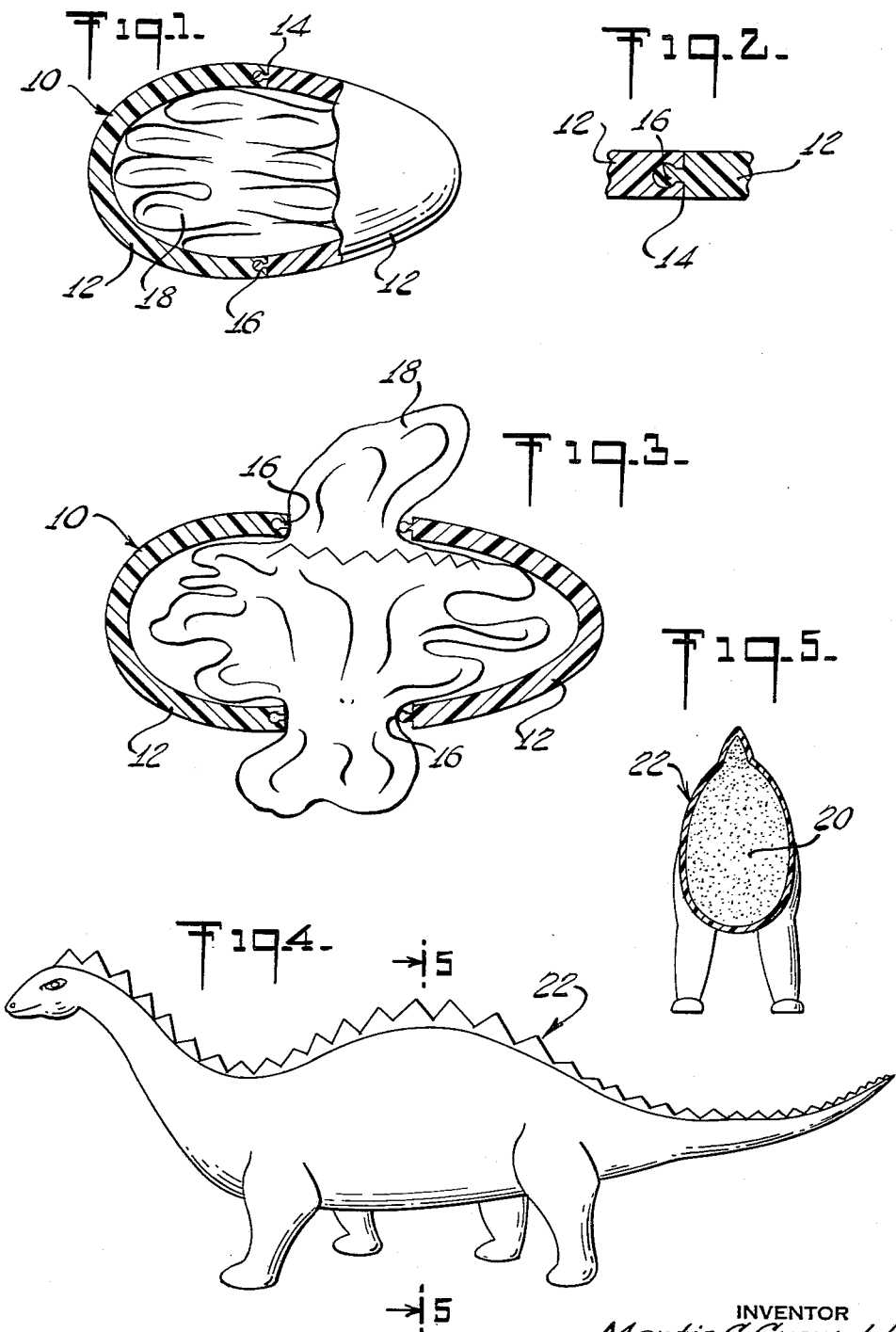

United States Patent Office 3,091,053
Patented May 28, 1963

3,091,053
SELF-RUPTURING CONTAINER
Martin C. Growald, New York, N.Y., assignor of fifteen percent to Albert C. Nolte, Jr., New York, N.Y.
Filed Sept. 16, 1960, Ser. No. 56,382
8 Claims. (Cl. 46—116)

The present invention relates to realistic toys in general and in particular to a simulated egg capable of hatching an animal upon the application of heat thereto.

According to one embodiment of the invention, a self hatching dinosaur egg includes two hemispherical shell portions joined together in interlocking fashion. Within the shell is a collapsed envelope portion, preferably made of plastic material, shaped in the form of a dinosaur, which contains a foamable resin and catalyst in an inactivated or unfoamed state. Upon the application of heat to the egg assembly in any desired manner, the critical temperature of the foamable plastic is reached and a rapid volumetric expansion takes place within the animal's skin, thus filling the shell and stressing its surface so that a realistic hatching of the dinosaur occurs from the egg. In other forms, the invention employs different species of animals which are normally hatched from eggs, such as chickens, ducks, ostriches, turtles, etc.

It is therefore an object of the invention to provide a realistic, self hatching egg which is expanded by means of a foaming plastic within an envelope contained within the egg.

Another object of the invention is to provide a combined toy assembly employing the novel self hatching eggs of the invention in combination with a hen and nest assembly wherein heat may be applied to the eggs in order to accelerate incubation thereof.

A still further object of the invention is to provide a realistic toy wherein a foaming plastic is employed to initially expel eggs from a hen at one temperature, and wherein additional foaming plastic is activated at a second temperature to hatch the baby animal from within the egg.

Yet another object of the invention is to provide an improved method of making toy articles.

Still another object of the invention is to provide a toy which is extremely realistic in operation, simple to use, highly reliable, educational, fascinating to watch, and economical to manufacture.

Other objects and advantages of the invention will become apparent and the invention will be fully understood from the following description and drawings in which:

FIG. 1 is a view, partially in section, showing the invention prior to hatching;

FIG. 2 is an enlarged view showing the interlocking means between the separable portions of the shell of FIG. 1;

FIG. 3 is a view of the invention during the hatching process;

FIG. 4 is a view of a dinosaur formed from the expansion of the foaming plastic within the egg;

FIG. 5 is a cross sectional view taken along line 5—5 of FIG. 4;

FIG. 6 is a perspective view, with portions broken away, showing a hen sitting upon a nest containing eggs;

FIG. 7 is an exploded perspective view of FIG. 6;

FIG. 8 is a view showing the hatched brood of chicks from the nest of FIG. 7; and FIG. 9 is a perspective view of an alternate form of incubation means contained within the nest.

Plastic materials are available which form rigid and semi-rigid foams by the reaction of the ingredients to evolve gases which in turn form bubbles throughout the soft liquid or semi-liquid mass and cause it to expand. Further reaction of the ingredients causes the foamy mass to harden into a rigid or semi-rigid foam. There are a number of plastics which undergo this foaming action; among them are the group known as polyurethanes. The foaming action takes place quickly and may be completed in a matter of seconds or minutes, depending upon the compositions employed and the temperatures applied. These foaming plastic materials usually comprise a mixture of a liquid resin and a catalyst in the desired proportions. The reaction of the two basic constituents may be inhibited by the storage of the material at a low temperature and may be caused to activate and foam by the mere raising of the temperature. In the practice of the present invention, a very siutable ratio of catalyst to resin has been found to be one that yields a foaming temperature of approximately 60° F., thereby allowing the unhatched eggs of the invention to be stored in a dormant state in a refrigerator or deep freeze.

Referring to the drawings in particular, the invention as embodied includes an egg shown generally at 10 having two interlocked cup-shaped shell portions 12 joined together along a peripheral hatching line 14 by a resilient tongue-and-groove fastening 16. The shell halves 12 may be made of any suitable resilient material, such as plastic or rubber or the like, and may be joined along a separable hatching line using any one of various known fastening techniques. Within the egg shell is an animal in collapsed form 18 which has been pre-filled with the previously described foamable plastic material 20 of sufficient amount, when activated, to entirely fill the internal volume of the animal 18. In a preferred form of the invention, the ratio of resin to catalyst of the foamable plastic material 20 is such that foaming will only occur upon the elevation of its temperature to approximately 60° F. from a lower temperature at which the plastic will remain in a dense form. As the temperature of the egg is raised, a rapid interaction of the elements occurs and causes a large volumetric expansion which pops the shell halves 12 apart and a realistic hatching of the animal occurs. After the expansion of the foamable plastic is complete, a dinosaur 22 in one form of the invention is completely erected (see FIGS. 4 and 5). It will readily be appreciated that in this form the invention may be stored in a freezer prior to hatching.

Referring to FIGS. 6 through 8, a toy employing the features of the invention is shown wherein a hen 24 is perched upon a plurality of eggs 26 in a nest of simulated straw 28. The hen 24 has an internal electrical resistance heater 31 connected to an electrical cord 32. In operation of this form of the invention, the animal 18 would be filled with a material so adapted to be activated at a temperature above normal room temperature, such as 110° F. The user would place the eggs within the nest 28 below the hen 24 and connect the cord 32 to a suitable electric outlet (not shown). As the eggs approach their activation temperature, the child would inspect for progress of the incubation and, at the required time, remove the hen from the nest and observe the continued hatching of the eggs as the foaming plastic proceeded to completely expand and form a plurality of baby chicks 30 (see FIG. 8). Of course, it should be realized that although four chicks have been shown as emerging from four eggs, it is entirely within the spirit of the invention to include two collapsible envelopes 18 within a single shell so that the simulation of twin chicks would occur from the hatching of a single egg.

FIG. 9 shows an alternate form of heater used to apply the necessary egg incubation heat. In this embodiment the heating element is contained within the nest 28 and includes resistance wires 31a connected to an electrical cord 32a.

Although applicant has described his invention in connection with an approximate 60° F. and a 110° F. activation temperatures of the foaming plastic, it should be realized that staggered hatching times may be readily provided by the mere varying of the catalyst-resin ratios within the eggs. In this manner, the enjoyment of the hatching cycle may readily be prolonged to extend over a longer period of time.

An example of a mixture of resin and catalyst that would have a 0° F. activation is:

| | Grams |
|---|---|
| Glyceril monoricinoleate | 5 |
| Water | .5 |
| Emulsifying agent | .5 |
| Castor oil | 30 |
| Quadrol | 10 |
| Ethyl cellulose | .1 |
| Isocyanate | 75 |

The isocyanate acts as the catalyst, while the remainder of the ingredients forms the resin. The foamable plastic is prepared by separately freezing the catalyst and resin into solid form. Thereafter they may be pulverized in any suitable manner into a powder and blended together without fear of foaming so long as the temperature remains below 0° F. In use, as the temperature of the powdered mixture is raised, the constituents melt and foaming will take place.

Also envisioned by the present invention is the use of a foamable plastic bladder contained within the lower portion of the hen 24 which would activate at a relatively lower temperature (i.e. 95° F.) to expel eggs from the hen. Upon continued heating of the eggs thus expelled, they would in turn hatch as previously described at a higher second temperature.

Although the shell has been shown as comprising two separable halves 12, 12, it should be realized that realistic hatching of the contents of the eggs may readily be accomplished through a slit in a portion of a pliable shell as well as in the manner shown.

While specific embodiments of the invention have been shown and described in detail to illustrate the application of the invention principles, it will be understood that the invention may be embodied otherwise without departing from such principles.

What is claimed is:

1. A simulated egg capable of hatching therefrom a toy animal, comprising a container member adapted to rupture upon application of a predetermined pressure, a collapsed envelope stored within said container member, said envelope forming the skin portion of a toy animal, and foamable material in an unexpanded state within said envelope, the quantity of said foamable material being sufficient to cause said envelope to expand into a toy animal when said material is expanded to provide a bulk sufficient to supply said predetermined pressure and rupture said container.

2. A simulated egg capable of hatching therefrom a toy animal according to claim 1, wherein said foamable material is a heat-sensitive plastic.

3. The method of making and using a toy egg comprising the steps of collapsing an envelope in the shape of the surface of a toy article within a rupturable container simulating an egg, enclosing within the envelope a foamable plastic material in an unfoamed state, and activating said material to expand said envelope and cause said envelope to rupture said container.

4. The method according to claim 3, wherein the activating of said foamable material is accomplished by the application of heat.

5. A self-hatching toy egg comprising a hollow shell having at least two portions separable upon application of a predetermined pressure, a collapsed envelope adapted to be expanded into the shape of an animal folded within said shell, and plastic foamable material in an unexpanded state within said envelope, the quantity of said foamable material being sufficient to cause said envelope to expand into a toy animal when said material is expanded to provide a bulk sufficient to apply said predetermined pressure and separate said portions.

6. A toy comprising a simulated hen, heating means within a lower portion of said hen, a simulated nest sized to fit said hen, and at least one egg capable of hatching therefrom a baby chick within said nest, said egg including a container member adapted to rupture upon application of a predetermined pressure, a collapsed envelope stored within said container member, said envelope forming the skin portion of a toy animal, and foamable material in an unexpanded state within said envelope, the quantity of said foamable material being sufficient to cause said envelope to expand into a toy animal when said material is expanded to provide a bulk sufficient to apply said predetermined pressure and rupture said container.

7. An article comprising a container adapted to rupture upon application of a predetermined pressure, a collapsed envelope adapted to be expanded into a predetermined form folded within said container, and a foaming material in an unfoamed state within said envelope, the quantity of said material being sufficient to expand said envelope into said predetermined form when said material is expanded to provide a bulk sufficient to apply said predetermined pressure and rupture said container.

8. A self-hatching toy egg according to claim 5 including heating means to raise the temperature of the egg to activate said foamable material.

References Cited in the file of this patent

UNITED STATES PATENTS

| 545,031 | Witte | Aug. 20, 1895 |
| 608,794 | Quinn | Aug. 9, 1898 |
| 685,345 | Perkins | Oct. 29, 1901 |
| 1,543,351 | Webb | June 23, 1925 |
| 2,498,074 | Feldman | Feb. 21, 1950 |
| 2,898,634 | Alderfer | Aug. 11, 1959 |

FOREIGN PATENTS

| 826,336 | Great Britain | Jan. 6, 1960 |